Nov. 17, 1936.   J. L. BREESE, JR   2,060,923
AIR CONDITIONING SYSTEM FOR MOTOR VEHICLE BODIES
Filed Sept. 10, 1934
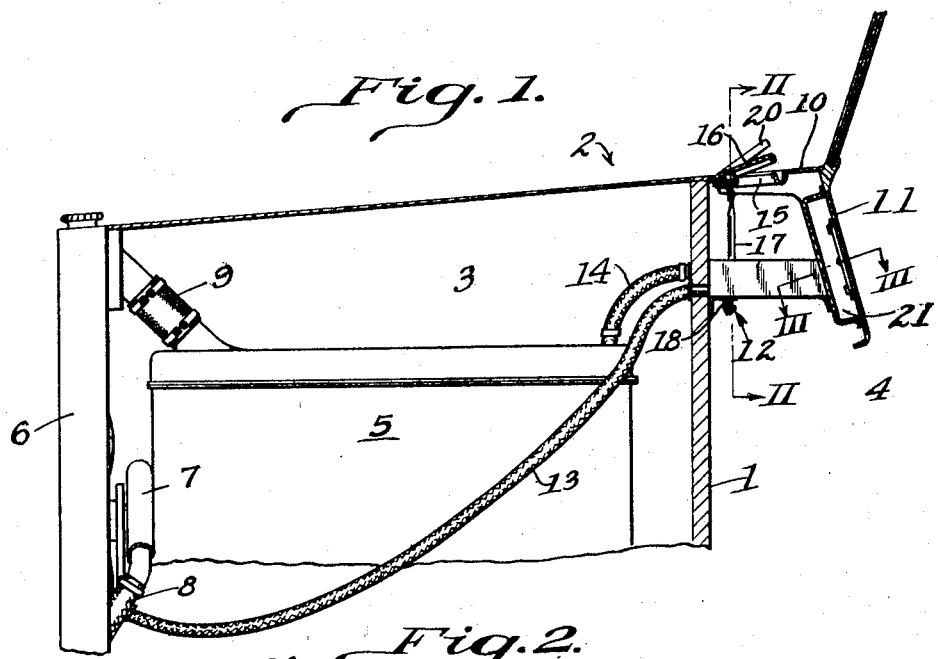
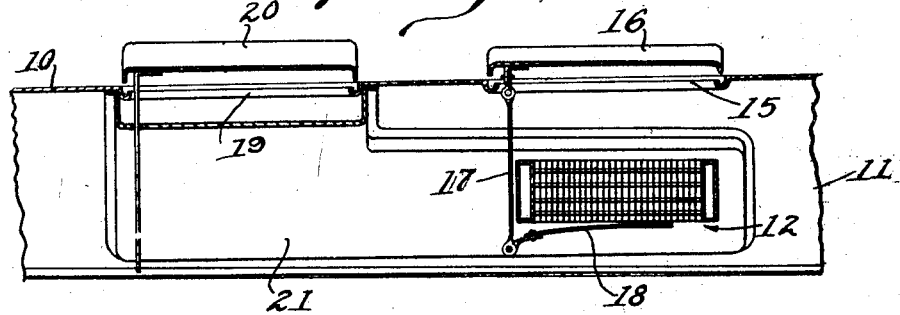
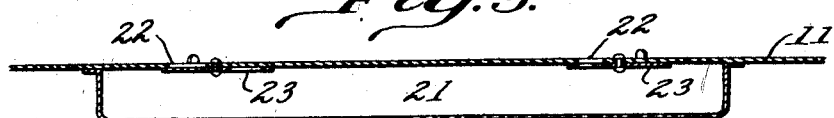
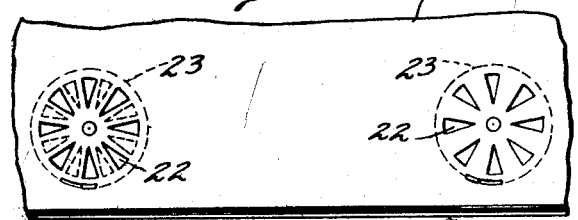
Inventor
James L. Breese Jr.
W. S. McDowell
Attorney Patented Nov. 17, 1936

2,060,923

UNITED STATES PATENT OFFICE 2,060,923

AIR CONDITIONING SYSTEM FOR MOTOR VEHICLE BODIES

James L. Breese, Jr., Santa Fe, N. Mex.

Application September 10, 1934, Serial No. 743,405

4 Claims. (Cl. 237—12.3)

This invention relates to the provision of an improved system for regulating the temperature, and otherwise conditioning, the atmosphere of the passenger compartment of a motor vehicle. A primary object of the invention resides in the provision of automatic means for controlling the introduction of fresh air into a vehicle body and at the same time regulating the temperature of the air to render it suitable for enhancing the comfort of the vehicle occupants.

For a further understanding of the invention, reference is to be had to the following description and the accompanying drawing, wherein:

Fig. 1 is a view in vertical section of a motor vehicle and illustrating the apparatus comprising the present invention in an operative position in connection therewith;

Fig. 2 is a vertical sectional view taken through the cowl or dash of the motor vehicle on the plane indicated by the line II—II of Fig. 1;

Fig. 3 is a horizontal sectional view on the plane disclosed by the line III—III of Fig. 1;

Fig. 4 is a front view of the air admitting dampers on the instrument panel of the motor vehicle;

Referring more particularly to the drawing, the numeral 1 designates the bulkhead or dash construction of a motor vehicle 2, the said bulkhead separating the vehicle, as usual, to define an engine compartment 3 and a passenger compartment 4. Arranged in the engine compartment 3 is an internal combustion engine 5 which in this instance has been shown as of the water-cooled type, being provided with an associated radiator 6, a water pump 7, a cool water return connection 8 between the lower end of the radiator and the suction side of the pump 7 and a flexible hose connection 9 between the upper end of the radiator and the upper portion of the water jacket of said engine.

Connected with the bulkhead 1 immediately beneath the cowl or hood 10 of the vehicle and in front of the instrument panel 11 thereof is a temperature regulator 12 which, in the form of the invention illustrated, comprises a standard radiator section composed of a plurality of parallel tubes of small diameter through and around which air may circulate in order to be influenced by the temperature of the walls of the radiator tubes. When it is desired to employ the regulator as a heater, the latter is connected by means of a flexible tube 13 with the connection 8 of the water circulating system, and by a corresponding tube 14 with the upper portion of the water circulating space of the engine 5. By this arrangement, water heated by the operation of the engine 5 will be allowed to circulate through the temperature regulator to heat air contacted with the parallel tubes of the regulator.

The cowl or hood 10 is provided with a ventilating opening 15, which is opened or closed by means of a hinged cover member 16. In this instance, the cover member is connected by means of a rod 17 with a thermostatic strip 18 carried by the regulator 12. When the regulator is used as a heater, the thermostatic strip upon being heated will flex to open the cover member 16, allowing for the passage of air from the outside through the opening 15, thence across the heated surfaces of the regulator tubes and into the vehicle body. Usually, the internal pressure within the body is maintained somewhat lower than the air pressures extraneous to said body so that there will be a positive advance of air through the opening 15 and thence across the regulator. The sub-normal pressures within the passenger compartment of the vehicle body may be afforded by the slight opening of the body windows, by deflectors which produce an aspirating action, or by the necessary crevices present in door frames and the like of the vehicle body which serve to extract air from the interior of the body, especially when the vehicle is in motion.

In further carrying out my improved system, the cowl or hood 10 may be provided with a second ventilating opening 19, as shown in Fig. 2, which may be opened or closed by a manually operated cover member 20. The opening 20 communicates with a casing or duct 21 which is arranged immediately to the rear of the instrument panel 11. The instrument panel may be provided with openings 22, directed toward the passengers within the compartment 4 and which openings may be governed by rotary damper devices 23. When the dampers are positioned to admit of the passage of air through the openings 22, air flow may be directed toward the faces of the vehicle occupants to provide for the delivery of fresh cold air and to overcome any discomfort which may be present by reason of the delivery of heated air to the vehicle body by the operation of the regulator 12.

What is claimed is:

1. An automobile heater comprising a radiator mounted adjacent to the passenger compartment of a vehicle, means for circulating a heated fluid through said radiator, an adjustable closure carried in conjunction with the body of the vehicle for regulating the passage of air through an opening provided in the vehicle body contiguous to said radiator, and thermostatic means governed by the temperature of said radiator and the air passed through said radiator for progressively opening or closing the closure respectively in accordance with increase or decrease of said temperature.

2. Temperature regulating apparatus for the passenger compartments of motor vehicles comprising a radiator mounted in connection with the bulkhead of a motor vehicle body behind the instrument panel thereof and immediately beneath a ventilating opening formed in the cowl construction of the vehicle body, an adjustable closure for said ventilating opening, and thermostatic means responsive to the temperature of the radiator and the temperature of the air heated thereby for automatically opening and closing said closure progressively in accordance with increase or decrease of said temperature.

3. In apparatus for heating the passenger compartment of a motor driven vehicle, in combination, a vehicle cowl having a ventilating opening formed therein, a movable closure for governing the passage of air through said opening and into the interior of the associated vehicle body, a heater mounted within said cowl in registration with said opening, and thermostatic means governed by the temperature of said heater for automatically varying the degree of opening of said closure, whereby to progressively increase the amount of air passing through said opening as the temperature of said heater increases and to progressively decrease the amount of air passing through said opening as the temperature of the heater decreases.

4. Temperature regulating apparatus for the passenger compartment of a motor vehicle comprising a radiator mounted adjacent to said compartment, said compartment being provided with a ventilating opening in registration with said radiator, a movable closure for said ventilating opening, a thermostat positioned adjacent said radiator and contacted by air passing therethrough, and a link connecting said thermostat and said movable closure whereby the latter will open or close according to the temperature variation of the radiator.

JAMES L. BREESE, Jr.